March 5, 1935. H. ROSER 1,993,529
CONTINUOUS MIXER FOR DOUGH AND THE LIKE SUBSTANCES
Original Filed Oct. 30, 1931

Inventor
Heinrich Roser

By George B. Willcox
Attorney

Patented Mar. 5, 1935

1,993,529

UNITED STATES PATENT OFFICE 1,993,529

CONTINUOUS MIXER FOR DOUGH AND THE LIKE SUBSTANCES

Heinrich Roser, Stuttgart-Cannstatt, Germany, assignor to Baker Perkins Company, Inc., Saginaw, Mich., a corporation of New York Original application October 30, 1931, Serial No. 572,176. Divided and this application October 21, 1933, Serial No. 694,622. In Germany November 1, 1930

3 Claims. (Cl. 259—3)

This invention relates to mixers of the rotary drum type for the continuous mixing and kneading or plasticizing of substances such as the ingredients of bread dough, viscose, synthetic resins, caustic-treated cellulose with carbin disulfide for the production of rayon, and other solid or semi-solid substances with liquid ingredients which assume plastic consistency after mixing.

The invention is also useful for shredding fibrous material such as paper and the like.

It is important that the ingredients shall be retained in the machine until the semi-solid or plastic state has been attained. Then the material should be thoroughly kneaded while being worked toward the discharge end of the mixer at an even rate of speed, giving a final product that is uniformly mixed and kneaded.

I accomplish these desirable results by mounting a mixing drum for rotation about its longitudinal axis which is in a recumbent or approximately horizontal position, having the lower part of its wall inclined upwardly toward its discharge end and arranging the mounting so that the inclination of the lower wall of the drum can be changed by adjustment according to the conditions of use. Also I provide means for feeding the material to be treated into the lower end of the drum remote from the discharge end. Stationary scraper blades are mounted within the drum to assist the mixing and kneading operation, and there is also a device for gradually urging the material along the upwardly inclined bottom wall of the revolving drum toward its discharge end.

In my pending application for patent, Serial No. 572,176, of which this application is a division, I have described mixing machines of the type in question which are well adapted to serve the purposes for which they are designed and which in some respects are similar to the mixer hereinafter described.

My present invention relates to certain novel arrangements and details of construction comprising the mixing, plasticizing or kneading and discharging mechanisms which are designed to increase the speed of the operations, to provide a simple and effective means for adjusting the rate of outward propulsion of the material in relation to the rate of rotation of the mixing drum, and to perform the mixing and kneading operation in consecutive stages, three in the embodiment of the invention herein illustrated, that follow one after the other in regular order to constitute together a unitary operation of converting fluid and solid ingredients into a uniform mass that is plastic, semi-fluid or dough-like, as the case may be.

According to my present invention the mixing and kneading actions are accomplished by the consecutive tumbling effects of several rotary drums arranged co-axially, the discharge drum being the largest and the intake drum being the smallest of the series, and these actions are supplemented by the actions of a propelling device associated with each drum consisting of a swinging disk or an annular ring. Means is also provided for adjusting the amount of swing that shall be imparted to the disks or rings, preferably by means of the rotation of the drums.

In the appended claims I have pointed out the essential elements of my invention, it being understood, however, that the claims are not intended to be limited to the form of the parts illustrated and described further than a limitation to the described form is necessary to distinguish them from the prior art.

Like reference characters indicate like parts in all the figures of the drawing.

Figure 1:
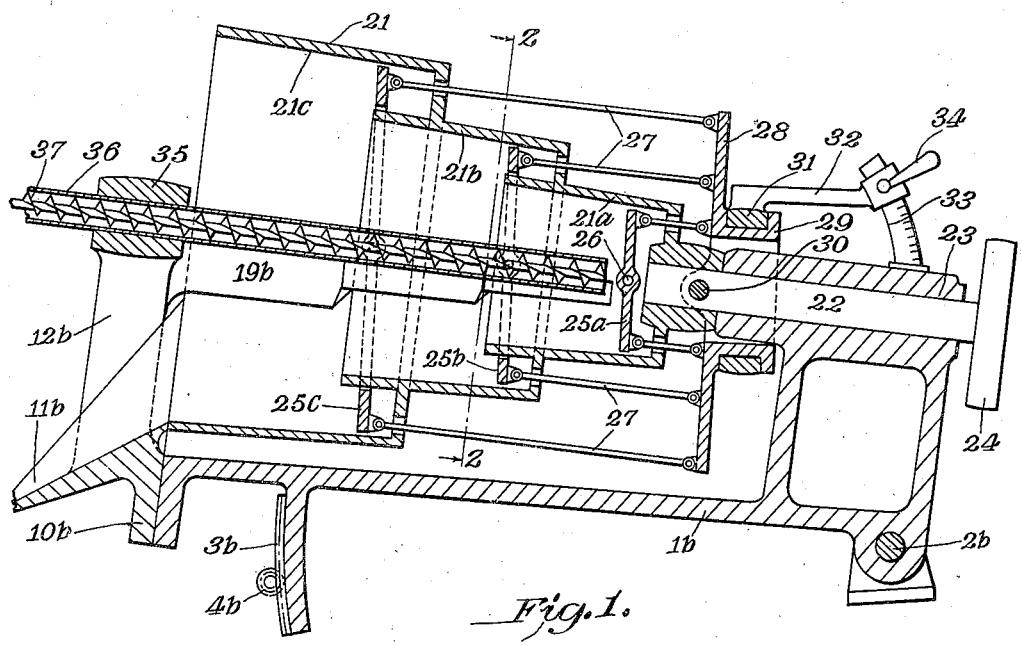
Fig. 1 shows a longitudinal vertical section of a preferred embodiment of the invention.
Figure 2:
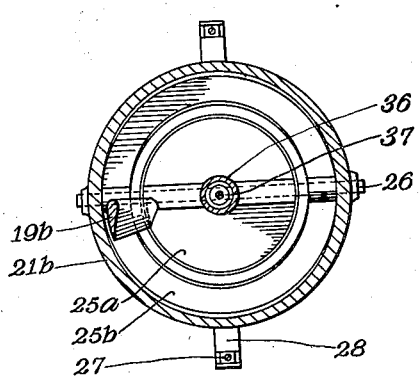
Fig. 2 is a cross sectional view of the drum, scraper and feeder, taken on line 2—2 of Fig. 1.

The frame 1b that carries the mixing drums is mounted at one end on a trunnion 2b and at another place is mounted on a gear segment 3b that projects downwardly from the frame, meshing with an adjustment pinion 4b for changing the angle of inclination of the frame and drums.

The drums 21a, 21b and 21c in which the material is worked constitute a three-step rotatable mixing barrel 21. The barrel is fixed axially to a shaft 22 which is mounted in a bearing 23 on frame 1b, and the shaft and barrel are rotated by means of a powered driving pulley 24. Within the barrel is a stationary scraping and kneading blade 19b, formed in steps or sections, each of which is arranged to scrape material from the up-coming wall of one of the drums 21a, 21b, 21c, and to knead and toss the material back into the bottom of the drum during the rotation of the latter. The larger end of the stepped blade 19b is fixed to a stationary supporting member, as 12b, that is carried by the flange 10b of a discharge spout 11b on frame 1b.

The member 12b has a sleeve or hub 35 that supports a suitable feed pipe 36 within which is a rotatable feed screw 37 for depositing crude materials at the closed end of the first and smallest drum 21a.

At the feed end of drum 21a is a disk mounted to swing or oscillate upon an axle 26. In the middle size drum 21b, occupying the annular space presented between its wall and the inwardly projecting discharge end of the next smaller drum 21a, is an annular ring 25b that is capable of similar oscillating movement during the rotation of the mixing barrel. The largest drum 21c is similarly equipped with an oscillating ring 25c. Suitable rods 27 are pin-connected to the rings 25b, 25c and disk 25a. The other ends of the rods are pivoted to arms 28 that project outwardly from a hub or guide bearing 29 which is pivotally secured to the head of the smallest drum 21a by means of a gudgeon pin 30.

Guide bearing 29 is adjustable by means of a collar 31, arm 32, quadrant 33 and clamping handle 34, for any desired angles of inclination of the mixing barrel.

Rotation of the barrel produces a swinging or oscillatory movement of the disk 25a and rings 25b and 25c. The amount of such movement is adjustable within appropriate limits by changing the angle of collar 31 by means of handle 34 or quadrant arm 32.

In operation the materials to be worked are fed continuously to the end of drum 21a. The rotation of the drums and the resultant repeated driving of the material into the stationary blade 19b thoroughly mixes the material and kneads it while it is being steadily moved toward the discharge end by the disk which exerts through its steady, swinging movement a pushing action on the material. The ring-shaped member 25b and 25c have movements similar to those of disk 25a and are supported between the slightly telescoped walls of two adjacent drums, for example, walls 21a and 21b, and walls 21b and 21c.

The material passes from the smallest drum to the largest in steps, although the mixing is one continuous operation.

The drums are preferably rotated just enough to cause centrifugal force to keep the partly plasticized material in contact with the drum wall until it encounters and is thrown off by the stationary scraping and kneading element 19b.

By the means above described I have produced a machine for mixing and kneading, wherein there is employed the rapidly rotating drums with means for feeding material into the smallest drum, and stationary mixing arms extending into the drums and lying close to their walls, and there is means for changing the inclination of the drum axis for the purpose of regulating the speed of operation, and the desired moving effect on the kneaded material is exerted by means of disk or ring elements arranged inside of the kneading drums, the disks and rings being put into swinging action by suitable means, as for example, by the rotation of the drums.

Having thus described my invention, what I claim and desire to secure by Letters Patent is:

1. A mixing machine, comprising in combination a barrel composed of a plurality of coaxially mounted drums arranged end-to-end to discharge successively from one into the other and successively larger in diameter toward the discharge end of said barrel, said barrel mounted in a recumbent position for rotation about its longitudinal axis, the bottom of the inner wall of each drum being inclined upwardly toward its discharge end, power-actuated means for driving said barrel and a stationary scraping and kneading blade stepped to conform to the inner surface thereof, material-propelling means within and rotatable with the barrel comprising a circular member in the inlet end of each drum concentric with and adjacent the wall thereof and mounted for oscillation in a direction lengthwise of the barrel, and means actuated by the barrel actuating means for imparting such oscillatory motion to said members.

2. A structure as set forth in claim 1 wherein the delivery end of each smaller drum projects into the receiving end of the next larger drum to provide an annular space within which the circular material-propelling member is operatively received.

3. A structure as set forth in claim 1 wherein the circular material-propelling member comprises a rotatable ring received between the ends of adjacent drums which are partly telescoped, and the means for imparting oscillatory motion to said members comprises links pivotally connecting said members to a pair of arms which are mounted on a hub that surrounds and is spaced apart from the drum shaft, and means for adjusting the inclination of said arms and hub with respect to the axis of said shaft.

HEINRICH ROSER.